United States Patent
Hu et al.

(10) Patent No.: US 11,174,392 B2
(45) Date of Patent: Nov. 16, 2021

(54) WATER-BASED COATINGS FOR IMPROVED PRINT PERFORMANCE WITH MULTIPLE PRINT TECHNOLOGY

(71) Applicant: Avery Dennison Corporation, Glendale, CA (US)

(72) Inventors: Ying Hu, Basking Ridge, NJ (US); Shanshan Wang, Mentor, OH (US)

(73) Assignee: Avery Dennison Corporation, Glendale, CA (US)

( * ) Notice: Subject to any disclaimer, the term of this patent is extended or adjusted under 35 U.S.C. 154(b) by 112 days.

(21) Appl. No.: 16/433,574

(22) Filed: Jun. 6, 2019

(65) Prior Publication Data

US 2019/0375943 A1 Dec. 12, 2019

Related U.S. Application Data

(60) Provisional application No. 62/681,466, filed on Jun. 6, 2018.

(51) Int. Cl.
| | | |
|---|---|---|
| *B41J 11/00* | (2006.01) | |
| *C09D 5/00* | (2006.01) | |
| *C09D 133/08* | (2006.01) | |
| *C09D 167/02* | (2006.01) | |
| *C09D 4/06* | (2006.01) | |

(52) U.S. Cl.
CPC .............. *C09D 4/06* (2013.01); *B41J 11/0015* (2013.01); *C09D 5/00* (2013.01); *C09D 133/08* (2013.01); *C09D 167/02* (2013.01)

(58) Field of Classification Search
CPC .......... C09D 4/06; C09D 133/08; C09D 5/00; C09D 167/02; B41J 11/0015
See application file for complete search history.

(56) References Cited

U.S. PATENT DOCUMENTS

| | | |
|---|---|---|
| 6,011,078 A | 1/2000 | Reich et al. |
| 6,433,038 B1 | 8/2002 | Tanabe et al. |
| 7,479,511 B2 | 1/2009 | Laksin et al. |
| 9,061,536 B2 | 6/2015 | Wiegers |
| 9,441,125 B2 | 9/2016 | Brandstein et al. |
| 9,556,348 B2 | 1/2017 | Brandstein et al. |
| 9,777,191 B2 | 10/2017 | Koger et al. |
| 2002/0121631 A1 | 9/2002 | Rahman et al. |
| 2002/0198289 A1 | 12/2002 | Gummeson |
| 2003/0180541 A1* | 9/2003 | Naik ..................... C09D 167/02 428/423.1 |
| 2004/0091645 A1 | 5/2004 | Heederik et al. |
| 2005/0238815 A1 | 10/2005 | Dvorchack et al. |
| 2006/0229412 A1 | 10/2006 | Laksin et al. |
| 2008/0090957 A1* | 4/2008 | Blum .................. C08G 18/0823 524/591 |
| 2008/0242757 A1 | 10/2008 | Dvorchak et al. |
| 2012/0046378 A1 | 2/2012 | Sloan |
| 2012/0328795 A1 | 12/2012 | Peeters et al. |
| 2013/0131211 A1 | 5/2013 | Sloan |
| 2015/0166829 A1 | 6/2015 | Koger et al. |
| 2017/0335129 A1 | 11/2017 | Wang et al. |
| 2019/0031888 A1 | 1/2019 | Jung et al. |

FOREIGN PATENT DOCUMENTS

| | | |
|---|---|---|
| CN | 1492909 | 4/2004 |
| CN | 1690146 | 11/2005 |
| CN | 104736647 | 6/2015 |
| CN | 102365176 | 3/2016 |
| CN | 102712820 | 5/2016 |
| CN | 106336794 | 1/2017 |
| CN | 104685009 | 1/2018 |
| EP | 0877067 | 3/2004 |
| EP | 1036831 | 7/2004 |
| EP | 1368427 | 6/2006 |
| EP | 2365036 | 9/2011 |
| EP | 1591502 | 10/2013 |
| EP | 1869097 | 6/2014 |
| EP | 2703459 | 1/2015 |
| EP | 2393665 | 3/2015 |
| EP | 2545124 | 8/2017 |
| EP | 2845885 | 1/2018 |
| EP | 3080211 | 1/2018 |
| EP | 3124556 | 4/2018 |
| WO | 03/066761 | 8/2003 |
| WO | 2017/021040 | 2/2017 |
| WO | 2017/131472 | 8/2017 |
| WO | 2017/201257 | 11/2017 |

OTHER PUBLICATIONS

International Search Report and Written Opinion dated Oct. 4, 2019 in corresponding IA No. PCT/US2019/035752 filed Jun. 6, 2019.
Written Opinion of the International Preliminary Examining Authority dated Mar. 26, 2020 issued in corresponding IA No. PCT/US2019/035752 filed Jun. 6, 2019.

* cited by examiner

*Primary Examiner* — Jessica M Roswell

(57) ABSTRACT

Various aqueous coating formulations are described. The compositions include one or more UV curable polyurethane dispersions, and optionally one or more of the following: non-UV curable acrylic polymers, a polyester dispersion, a non-UV curable polyurethane dispersion, and one or more additives. The compositions can be used to form top coats that exhibit good resistance to scratches and solvents, and improved ink adhesion and image quality.

18 Claims, No Drawings

WATER-BASED COATINGS FOR IMPROVED PRINT PERFORMANCE WITH MULTIPLE PRINT TECHNOLOGY

CROSS-REFERENCE TO RELATED APPLICATION

The present application claims the benefit of U.S. Provisional Patent Application No. 62/681,466 filed Jun. 6, 2018, which is incorporated herein by reference in its entirety.

FIELD OF THE DISCLOSURE

The present disclosure relates generally to coatings, and in particular to water-based coatings for improving print performance with multiple print technology.

BACKGROUND OF THE DISCLOSURE

Coating compositions can be applied to paper and polymeric films to provide or impart certain characteristics to the coated substrate. For example, top coats can provide a particular appearance, such as a glossy surface, and/or provide appropriate characteristics for receiving printing media or inks. For many print processes, a coating formulation is applied as a topcoat, the primary purpose of which is to provide good ink anchorage properties for subsequent application of inks, such as UV-cured and non-UV-cured inks. For example, in UV flexographic (flexo) printing, UV screen printing and cold foil printing technologies, a UV ink or a UV cured adhesive is put down on top of the coating. However, the current market is rapidly transitioning towards digital printing. Therefore, developing good ink anchorage and image quality is a key quality for any acceptable top coating.

Traditionally, coating formulations have been customized depending on the properties of the specific target substrate as well as the printing technology being employed. In view of the transition to increased usage of multiple printing technologies, the need exists for multi-use coatings, e.g., top coatings, and for formulations used to form such coatings, that can work well with various types of printing technologies, such as water-based flexo printing, UV flexo printing, UV Inkjet, UV screen printing and cold foil printing.

SUMMARY OF THE DISCLOSURE

Water-based compositions that can be used to form a coating, e.g., a top coat, for a variety different substrate types are described herein. The formation of a top coat using the compositions described herein provide improved ink adhesion and image quality for UV inkjet printing. The coating formulations ideally also achieve other beneficial performance characteristics for coatings formed therefrom, such as good water fastness and antiblocking properties.

In one embodiment, the formulation is an aqueous coating formulation, containing water; a UV curable polymer containing a UV curable polyurethane, a UV curable acrylic polymer, or a UV curable polyurethane/acrylic copolymer; two or more of a non-UV curable acrylic polymer dispersion, a polyester dispersion, and a non-UV curable polyurethane dispersion; and optionally one or more UV curable additives.

In one embodiment, the formulation is an aqueous coating formulation, containing water; a UV curable polymer containing a UV curable polyurethane, a UV curable acrylic polymer, or a UV curable polyurethane/acrylic copolymer; optionally a non-UV curable acrylic polymer dispersion; a polyester dispersion; a non-UV curable polyurethane dispersion; and optionally one or more UV curable additives.

In another embodiment, the formulation is an aqueous coating formulation, containing: water; a UV curable polymer containing a UV curable polyurethane, a UV curable acrylic polymer, or a UV curable polyurethane/acrylic copolymer; a non-UV curable acrylic polymer dispersion; optionally a polyester dispersion; a non-UV curable polyurethane dispersion; and optionally one or more UV curable additives.

In another embodiment, the formulation is an aqueous coating formulation, containing: water; a UV curable polymer containing a UV curable polyurethane, a UV curable acrylic polymer, or a UV curable polyurethane/acrylic copolymer; a non-UV curable acrylic polymer dispersion; a polyester dispersion; optionally a non-UV curable polyurethane dispersion; and optionally one or more UV curable additives.

In any of the above formulations, the UV curable polymer may be present in an amount from about 1 to about 50 wt. %, about 1 to about 25 wt. %, about 3 to about 17 wt. %, about 5 wt. % to about 15 wt. %, or about 8 wt. % to about 15 wt. %, about 10 wt. % to about 25 wt. % or about 15 wt. % to about 22%; the non-curable polyurethane dispersion may be present in an amount from about 1 to about 50 wt. %, about 5 to about 45 wt. %, about 10 to about 40 wt. %, about 10 wt. % to about 15 wt. % or about 15 wt. % to about 30 wt. %, about 15 wt. % to about 25 wt. %, or about 15 wt. % to about 22%; the polyester dispersion may be present in an amount from about 1 to about 75 wt. %, about 1 to about 50 wt. %, about 5 to about 45 wt. %, about 10 to about 40 wt. %, about 10 wt. % to about 20 wt. %, about 15 wt. % to about 18 wt. % or about 20 wt. % to about 35%, about 20 wt. % to about 30 wt. %, or about 25 wt. % to about 30 wt. %; and the non-UV curable acrylic polymer dispersion may be present in an amount from about 1 to about 90 wt. %, about 1 to about 50 wt. %, about 5 to about 45 wt. %, or about 10 to about 40 wt. %, about 10 wt. % to about 20 wt. %, about 15 wt. % to about 18 wt. % or about 20 wt. % to about 35%, about 20 wt. % to about 30 wt. %, or about 25 wt. % to about 30 wt. %.

In any of the above formulations, the UV curable polymer may contain a UV curable polyurethane in an amount from about 1 to about 50 wt. %, about 1 to about 25 wt. %, about 3 to about 17 wt. %, about 5 wt. % to about 15 wt. %, or about 8 wt. % to about 15 wt. %, about 10 wt. % to about 25 wt. % or about 15 wt. % to about 22%. Additionally, or alternatively, the UV curable polymer may contain a UV curable acrylic polymer in an amount from about 1 to about 50 wt. %, about 1 to about 25 wt. %, about 3 to about 17 wt. %, about 5 wt. % to about 15 wt. %, or about 8 wt. % to about 15 wt. %, about 10 wt. % to about 25 wt. % or about 15 wt. % to about 22%. Additionally, or alternatively, the UV curable polymer may contain a UV curable polyurethane/acrylic co-polymer in an amount from about 1 to about 50 wt. %, about 1 to about 25 wt. %, about 3 to about 17 wt. %, about 5 wt. % to about 15 wt. %, or about 8 wt. % to about 15 wt. %, about 10 wt. % to about 25 wt. % or about 15 wt. % to about 22%.

In any of the formulations above, the formulation may contain less than about 0.5 wt. %, less than about, 0.3 wt. %, e.g., or less than about 0.1 wt. %, surfactant.

The formulation may further contain one or more antiblocking agents, optionally containing silica and/or PMMA.

In any of the above the formulations, the formulation is optionally free of one or more of a hard polyurethane, cross-linker, and/or photoinitiator and contains less than about 0.5 wt. %, less than about, 0.3 wt. %, e.g., or less than about 0.1 wt. %, surfactant (e.g., defoamer). In any of the above formulations, the formulation may be free of surfactant and/or cross-linker.

In some aspects, in any of the formulations above, the UV curable polymer is present in an amount from about 3 to about 17 wt. %, the polyester dispersion is present in an amount from about 1 to about 50 wt. %, and the non-UV curable polyurethane dispersion is present in an amount from about 3 to about 17 wt. %.

In some aspects, in any of the formulations above, the UV curable polymer is present in an amount from about 3 to about 17 wt. %, the non-UV curable acrylic polymer is present in an amount from about 1 to about 50 wt. %, and the non-UV curable polyurethane dispersion is present in an amount from about 3 to about 17 wt. %.

In some aspects, in any of the formulations above, the UV curable polymer is present in an amount from about 3 to about 17 wt. %, the non-UV curable acrylic polymer is present in an amount from about 1 to about 50 wt. %, and the polyester dispersion is present in an amount from about 1 to about 50 wt. %.

A process for forming a coating described herein is also disclosed. For example, in one embodiment, the process for forming a coating includes: (a) applying an aqueous coating formulation onto a substrate, wherein the aqueous coating formulation contains: water; a UV curable polymer comprising a UV curable polyurethane, a UV curable acrylic polymer, or a UV curable polyurethane/acrylic copolymer; optionally a non-UV curable acrylic polymer dispersion; a polyester dispersion; a non-UV curable polyurethane dispersion; and optionally one or more UV curable additives; and (b) drying the applied coating formulation to form the coating.

In some embodiments, the process for forming the coating includes (a) applying an aqueous coating formulation onto a substrate, wherein the aqueous coating formulation contains: water; a UV curable polymer comprising a UV curable polyurethane, a UV curable acrylic polymer, or a UV curable polyurethane/acrylic copolymer; a non-UV curable acrylic polymer dispersion; optionally a polyester dispersion; a non-UV curable polyurethane dispersion; and optionally one or more UV curable additives; and (b) drying the applied coating formulation to form the coating.

In another embodiment, the process for forming the coating includes (a) applying an aqueous coating formulation onto a substrate, wherein the aqueous coating formulation comprises: water; a UV curable polymer comprising a UV curable polyurethane, a UV curable acrylic polymer, or a UV curable polyurethane/acrylic copolymer;
a non-UV curable acrylic polymer dispersion; a polyester dispersion; optionally a non-UV curable polyurethane dispersion; and optionally one or more UV curable additives; and
(b) drying the applied coating formulation to form the coating.

In the processes described above, the drying optionally includes heating the applied formulation.

DETAILED DESCRIPTION OF THE DISCLOSURE

Water-based compositions that can be used to form a coating, such a "top coat," on a variety of different substrate types are described herein. "Water-based" as used herein means that water is the only or the primary (majority) solvent. However, some of the components in the composition may contain small amounts of water-miscible solvents/alcohols that act as plasticizers to facilitate film formation of the polymeric components in the composition. In some embodiments, the concentration of the water-miscible solvents/alcohols is less than about 5%, 4%, 3%, 2%, 1%, 0.5%, 0.3%, 0.2%, or 0.1% by weight of the composition.

Conventional UV inks may then be applied onto the coating and UV cured. The coatings formed from the coating formulations described herein beneficially provide desirable ink adhesion and image quality characteristics, in particular for UV inkjet printing applications. The coatings may also provide excellent water fastness and anti-blocking characteristics.

Coating compositions particularly adapted for being applied to various substrates such as cellulosic materials, e.g., paper, or polymeric films to improve printing characteristics and ink adherence properties are also disclosed herein. In particular embodiments, the compositions can be used as top coat compositions for polymeric films such as polyester films, polyolefin films, such as polypropylene or polyethylene films, and particularly for bi-axially oriented polypropylene (BOPP) films, or metallized plastics, e.g., metallized BOPP. The compositions are also well suited for use as top coat compositions for machine direction orientation (MDO) polymeric films.

With the market moving towards personalization and short run, more variable information, a transition from flexo printing to digital printing is appearing. As a result, coating formulations must increasingly enable excellent UV ink image quality. There has been significant work done to trial various substrates at multiple press original equipment manufacturers (OEMs). It is generally observed that when evaluating image quality, end users tend to focus on the "smoothness" of solid color block and the minimum readable fonts. During UV inkjet printing, ink is jetted onto the surface, and then spread and congregated to form the solid block. If a coating makes the ink "flow," a less "grainy" solid color block is typically observed, while smaller fonts become less defined.

In various embodiments, the coating formulations described herein having different combinations of components that may be used to form coating compositions, e.g., top coatings. The coating compositions are well-suited for receiving one or more inks, optionally one or more UV cured ink jet inks, and demonstrating excellent ink adhesion and image quality. In various optional aspects, the formulation may contain less than about 0.5 wt. %, less than about 0.3 wt. %, or less than about 0.1 wt. % or may be free of one or more of hard polyurethanes, crosslinkers, photoinitiators, and/or surfactants.

In one embodiment, the aqueous coating formulation contains an aqueous coating formulation, containing: water; a UV curable polymer comprising a UV curable polyurethane, a UV curable acrylic polymer, or a UV curable polyurethane/acrylic copolymer; optionally a non-UV curable acrylic polymer dispersion; a polyester dispersion; a non-UV curable polyurethane dispersion; and optionally one or more UV curable additives.

In another embodiment, the aqueous coating formulation contains an aqueous coating formulation, containing: water; a UV curable polymer comprising a UV curable polyurethane, a UV curable acrylic polymer, or a UV curable polyurethane/acrylic copolymer; a non-UV curable acrylic polymer dispersion; optionally a polyester dispersion; a non-UV curable polyurethane dispersion; and optionally one or more UV curable additives.

In another embodiment, the aqueous coating formulation containing an aqueous coating formulation, containing: water; a UV curable polymer comprising a UV curable polyurethane, a UV curable acrylic polymer, or a UV curable polyurethane/acrylic copolymer; a non-UV curable acrylic polymer dispersion; a polyester dispersion; optionally a non-UV curable polyurethane dispersion; and optionally one or more UV curable additives.

In another embodiment, processes for forming a coating from any of the formulations are described herein. The process includes applying the formulation onto a substrate and drying the applied formulation, optionally with heat, to form the coating on the substrate. The coating is ideally suited for receiving a UV cured ink, e.g., a UV cured ink jet ink, resulting in excellent ink adhesion and image quality on a variety of different substrates.

A. UV Curable Polymers

In the above embodiments, the UV curable polymer may be a UV curable polyurethane dispersion, a UV curable acrylic polymer, or a UV curable polyurethane/acrylic copolymer. The UV curable polymer preferably contains an unsaturated bond. When the UV curable components are blended in the coating formulations, and when the coating is printed with UV ink under UV light, they advantageously can form covalent bonds with the ink(s), achieving a high degree of ink anchorage without the need for a separate photoinitiator or crosslinker in the coating formulation.

In particular embodiments, the UV curable polymer contains a UV curable polyurethane dispersion. Examples of UV curable polyurethanes suitable for use in the coating formulations of the present disclosure include unsaturated double bonds. Non-limiting examples of UV curable polyurethane dispersions include those market by Alberdingk Boley as LUX 220 and LUX250. These dispersions have particularly high molecular weights lending them well-suited for excellent physical drying performance and mechanical resistance. "High molecular weight" as used with respect to the UV-curable polyurethane means the polyurethane can form a free film, i.e., can be removed after drying. The UV curable polyurethane may be used either alone or blended with other polyurethanes, which may be UV curable or non-UV curable. Other examples of UV curable polyurethanes suitable for use in the present coating formulations include DSM resins such as DSM R-460, DSM R-466. In some embodiments, the UV curable polyurethane has sufficient molecular weight to form a free film after drying (before cure) as defined above. In some embodiments, the molecular weight is from about 150,000 to 400,000 Daltons, from about 150,000 to about 300,000 Daltons, or from about 150,000 to about 250,000 Daltons.

In other embodiments, the UV curable polymer contains a UV curable acrylic polymer dispersion. Examples of UV curable acrylic polymer dispersions suitable for use in the coating formulations of the present disclosure include, but are not limited to, Alberdingk Boley LUX 515, produced by Alberdingk Boley. In some embodiments, the UV curable acrylic polymer has sufficient molecular weight to form a free film after drying (before cure) as defined above. In some embodiments, the molecular weight is from about 150,000 to 400,000 Daltons, from about 150,000 to about 300,000 Daltons, or from about 150,000 to about 250,000 Daltons.

In other embodiments, the UV curable polymer contains a UV curable polyurethane/acrylic copolymer dispersion. Examples of UV curable polyurethane/acrylic copolymer dispersions suitable for use in the coating formulations described herein include, but are not limited to, Alberdingk Boley LUX 286, Alberdingk Boley LUX 290, Alberdingk Boley LUX 399, Alberdingk Boley LUX 481, Alberdingk Boley LUX 482, Alberdingk Boley LUX 484, and Alberdingk Boley LUX 560, produced by Alberdingk Boley. In some embodiments, the UV curable polyurethane/acrylic polymer has sufficient molecular weight to form a free film after drying (before cure) as defined above. In some embodiments, the molecular weight is from about 150,000 to 400,000 Daltons, from about 150,000 to about 300,000 Daltons, or from about 150,000 to about 250,000 Daltons.

The amount of the UV curable polymer contained in the coating formulation may vary so long as the formulation maintains desirable application and processing, e.g., drying, characteristics and so long as the formulation forms a coating, e.g., top coat, suitable for receiving UV curable ink. In some non-limiting exemplary embodiments, the coating formulation contains the UV curable polymer in an amount from about 1 to about 50 wt. %, about 1 to about 25 wt. %, about 3 to about 17 wt. %, about 5 wt. % to about 15 wt. %, or about 8 wt. % to about 15 wt. %, about 10 wt. % to about 25 wt. % or about 15 wt. % to about 22%. As used herein, unless otherwise indicated, weight percent or wt. % refers to weight percent based on the total weight of the formulation, including water. These ranges apply to the total UV curable polymer content of the coating formulation. For example, if the coating formulation includes both a UV curable polyurethane dispersion and a UV curable acrylic polymer dispersion, the amount of the UV curable polyurethane dispersion and the amount of the UV curable acrylic polymer dispersion are added together to arrive at the concentrations recited above.

B. Non-UV Curable Polyurethane Dispersions

In addition to containing a UV curable polymer, the compositions additionally contain one or more non-UV curable polyurethane dispersions, also referred to as "primer" polyurethane dispersions. The inclusion of non-UV curable polyurethane dispersions facilitates good adhesion of the coating formulations onto the desired substrate and helps with providing good ink anchorage characteristics. Non-limiting examples of non-UV curable polyurethane dispersions include, but are not limited to, DSM R600 or Alberdingk Boley U4000. DSM R600 is an aliphatic urethane dispersion designed for filmic primer applications. It provides excellent adhesion to several different types of substrates, showing high bond strength and humid seal strength. Alberdingk U4000 is an aliphatic polyurethane dispersion that is hydrolysis resistant and provides extremely good adhesion properties. Additional optional non-UV curable polyurethane dispersions include, but are not limited to, NEOREZ™ R-9621 available from DSM NeoResins. NEOREZ™ R-9621 is an aliphatic polyester waterborne urethane. In some embodiments, the non-UV curable polyurethane dispersion contains a "soft" non-UV curable polyurethane dispersion.

In some embodiments, the coating formulation is free of so-called "hard" polyurethane dispersions and aliphatic, fully saturated, polyurethane dispersions. Examples of such hard polyurethane dispersions unsuitable for use in a top coat compositions include, but are not limited to, BAYHYDROL® UH XP 2719 available from Bayer Material Science. BAYHYDROL® UH XP 2719 is an aliphatic, polyester-based anionic polyurethane dispersion. In other embodiments, however, the coating formulation may contain UV curable or non-UV curable hard polyurethane dispersions, which may function, for example, as an anti-blocking agent. "Hard" as used herein typically means a polymer having a Koening hardness of at least 70 seconds after drying.

The amount of the non-UV curable polyurethane dispersion contained in the coating formulation may vary so long as the formulation forms a coating, e.g., top coat, suitable for receiving ink, e.g., UV ink, optionally UV inkjet ink. In some non-limiting exemplary embodiments, the coating formulation contains the non-UV curable polyurethane dispersion in an amount from about 1 to about 50 wt. %, about 5 to about 45 wt. %, about 10 to about 40 wt. %, about 10 wt. % to about 15 wt. % or about 15 wt. % to about 30 wt. %, about 15 wt. % to about 25 wt. %, or about 15 wt. % to about 22%, based on the total weight of the formulation, including water. These ranges apply to the total non-UV curable polyurethane dispersion content of the coating formulation. For example, if the coating formulation includes multiple non-UV curable polyurethane dispersions, the total amount of non-UV curable polyurethane dispersions are added together to arrive at the concentrations recited above.

C. Polyester Dispersions

The compositions described herein additionally contain one or more water soluble polyester dispersions. In many embodiments, this component is in the form of a water dispersible linear polyester prepared from the polycondensation of glycols and dicarboxylic acids, at least some of which contain functional groups such as but not limited to, sulfonate salts (—$SO_3M$), carboxyl groups (—COOH), and combinations thereof. Typical molecular weights for the polyester range from about 5,000 to about 20,000 with about 10,000 to about 14,000 being useful for many applications. Typical glass transition (Tg) temperatures range from about 25 to about 65° C., e.g., from about 36° C. to about 52° C. with about 42° C. to about 46° C. being useful for certain embodiments. Non-limiting examples of a suitable water polyester is SKYBON EW 100Q available from SK Chemicals. Additional examples of suitable polyesters include those marketed by Eastman as Eastek 1100, Eastek 1200, Eastek 1300, and Eastek 1400. These polyester dispersions contain on the order of 25-40 wt. % polymer solids, e.g., 30-35 wt. %, and provide fast drying rates, low odor and low foaming characteristics. The polyester dispersion preferably has a viscosity ranging from about 10 to about 100 cP and have an average particle diameter from about 10 to about 60 nm, e.g., from about 10 to about 30 nm. The polyester dispersions are preferably surfactant free. In some optional aspects, the polyester may be in solid, e.g., powder, form allowing for the end user to disperse the material into a liquid carrier by adding water. For example, Eastek 1100 can be prepared from AQ 55S polymer, 1200 can be prepared from 65S polymer.

The amount of the polyester dispersion contained in the coating formulation may vary so long as the formulation maintains desirable application and processing, e.g., drying, characteristics and so long as the formulation forms a coating, e.g., top coat, suitable for receiving ink. In some non-limiting exemplary embodiments, the coating formulation contains the polyester dispersion in an amount from about 1 to about 75 wt. %, about 1 to about 50 wt. %, about 5 to about 45 wt. %, about 10 to about 40 wt. %, about 10 wt. % to about 20 wt. %, about 15 wt. % to about 18 wt. % or about 20 wt. % to about 35%, about 20 wt. % to about 30 wt. %, or about 25 wt. % to about 30 wt. %, based on the total weight of the formulation, including water. These ranges apply to the total polyester dispersion content of the coating formulation. For example, if the coating formulation includes multiple polyester dispersions, the total amount of polyester dispersions are added together to arrive at the concentrations recited above.

D. Non-UV Curable Acrylic Polymer Dispersions

The compositions described herein additionally may contain one or more non-UV curable acrylic polymer dispersion. If present in the formulation, this component is preferably in the form of a water dispersible acrylic polymer, preferably containing fully saturated and/or aliphatic acrylic polymers. Examples of such non-UV curable acrylic polymers include, but are not limited to, DSM A-1127, AC 3660, AC 2403 and AC 3687. DSM A-1127 is a self-crosslinking acrylic copolymer dispersion that combines excellent adhesion and good chemical and physical resistance properties. The total solids content of the non-UV curable acrylic polymer dispersion optionally ranges from about 30 to about 50 wt. %, e.g., from about 40 to about 50 wt. %. Alberdingk Boley AC 3660, AB 2403, and AB 3687 are also suitable self-crosslinking acrylic copolymer dispersions. AB 2403 is a two phase fast-drying acrylic dispersion having a 46-48 wt. % solids content, neutral to slightly basic pH and a viscosity from 700 to 3000 mPas.

The amount of the non-UV curable acrylic polymer dispersion contained in the coating formulation may vary so long as the formulation maintains desirable application and processing, e.g., drying, characteristics and so long as the formulation forms a coating, e.g., top coat, suitable for receiving ink. In some non-limiting exemplary embodiments, the coating formulation contains the non-UV curable acrylic polymer dispersion in an amount from about 1 to about 90 wt. %, about 1 to about 50 wt. %, about 5 to about 45 wt. %, or about 10 to about 40 wt. %, about 10 wt. % to about 20 wt. %, about 15 wt. % to about 18 wt. % or about 20 wt. % to about 35%, about 20 wt. % to about 30 wt. %, or about 25 wt. % to about 30 wt. %, based on the total weight of the formulation, including water. These ranges apply to the total non-UV curable acrylic polymer dispersion content of the coating formulation. For example, if the coating formulation includes multiple non-UV curable acrylic polymer dispersion, the total amount of non-UV curable acrylic polymer dispersions are added together to arrive at the concentrations recited above.

E. Additives

The coating formulations described herein may contain one or more additives, which may or may not be UV curable. The fillers may include, for example, one more of: antiblocking agents, crosslinkers, fillers, surfactant (e.g., defoamers), wetting out agents, and/or mar and scratch resistant enhancing agents. As indicated above, in some embodiments the formulation is free of crosslinkers. In other aspects, however, a minor amount of crosslinker may be included in the formulation.

Suitable antiblocking agents include, for example, one or more silica component(s) or poly(methyl methacrylate) (PMMA). Typically, the antiblocking agent has an average particle size of from about 0.1 μm to about 6 μm, e.g., from about 1 to about 6 μm, from about 2 μm to about 6 μm, and for about 4 μm to about 6 μm, or from about 4.3 μm to about 5.3 μm. A non-limiting example of a suitable silica component is SYLOBLOC® 45 available from Grace Davison Engineered Materials. Suitable silica is also available commercially as SYLOBLOC K200 and SYLOID S7000. If present, the formulation may contain antiblocking agent, e.g., silica, in an amount from about 0.1 to about 5 wt. %, e.g., from about 0.1 to about 1 wt. % or from about 0.1 to about 0.5 wt. %, based on the total weight of the formulation. A non-limiting example of PMMA antiblocking agent is Aquasafe matting agent from Polytex.

As indicated above, in some embodiments, the compositions also contain one or more crosslinkers or crosslinking agents that serve to crosslink or at least promote crosslinking of the polyurethane component(s). In some embodiments, the crosslinker is an aziridine, or carbodiimide crosslinker. A non-limiting example of an aziridine crosslinker is CX-100 available from DSM NeoResins. DSM CX-100 is a polyfunctional aziridine liquid crosslinker. Additional crosslinkers include isocyanates, metal chelating components. Non-limiting examples include, but are not limited to, Stahl Permutex 5577 and Covestro Bayhydur 302 (a solvent free, polyisocyanate based on hexamethylene diisocyanate (HDI)).

Additional processing can be performed upon either the surface to receive the top coat formulation, or upon the top coat layer, or both. For example, corona treatment may be performed upon the surface to receive the top coat, prior to applying the top coat. Alternatively, or in addition, corona treatment may be performed upon a previously applied and formed top coat.

F. Methods of Making Compositions

Useful top coat compositions can be prepared by addition of water to the components described herein. It will be understood that certain components may include water such as for example the polyurethane dispersion(s) and the polyester. In addition to water, the components may also include small amounts of water miscible solvents/alcohols which function as plasticizers to facilitate film formation of the polymeric component. Thus, the water associated with those components may be sufficient to achieve a desired water content for the resulting composition. Alternatively, additional amounts of water are added to produce an aqueous top coat composition with properties and/or characteristics as desired.

An exemplary formulation contains a UV curable polymer at a concentration of about 1 wt. % to about 25 wt. %; a non-UV curable polyurethane dispersion at a concentration of about 10 wt. % to about 40 wt. %; a non-UV curable acrylic polymer at a concentration of about 10 wt. % to about 40 wt. %; a polyester dispersion at a concentration of about 10 wt. % to about 40 wt. %; an antiblocking agent at a concentration of about 0.1 wt. % to about 1 wt. %; and water at a concentration of about 2 wt. % to about 5 wt. %. The formulation has a solids content of about 30% to about 50%.

Prior to coating, the formulation above can be further diluted in water and a surfactant, e.g., defoaming agent, is added at a concentration of less than about 1 wt. % or less than about 0.5 wt. %. Water is present at a concentration of about 35% to about 50%. The solids content is from about 15% to about 25%.

In some aspects, a plurality of components for the formulation, but not all of components for the formulation, are pre-blended to form a preblend, which is then combined with the remaining components to form the coating formulations disclosed herein. For example, in one non-limiting example, in some aspects, the UV curable polymer, the non-UV curable acrylic polymer dispersion, and the non-UV curable polyurethane dispersion may be preblended to form a preblend, which is later combined with one or more of a polyester dispersion and one or more additives, e.g., antiblocking agent such as silica, to form the final coating formulation. Of course, other combinations and orders of addition are possible to form any number of different preblend formulations, which are ultimately combined to form the final coating formulations described herein.

The compositions such as top coat compositions can be applied to a surface or substrate using a wide array of techniques and methods. When applying as a top coat to a polymeric film, conventional application techniques can be used. Representative coat weights for top coats in accordance with the present subject matter range from about 0.1 to about 3.0 grams per square meter (gsm), from about 0.1 to about 1.0 gsm, or from about 0.5 gsm to about 0.6 gsm.

Typically, after application to a surface of interest such as a polymeric film, the resulting coating is dried. As will be appreciated, the time period for drying depends upon several factors including the drying temperature and the amount of water and/or other vehicles or solvent present in the coated composition. The present subject matter includes drying at ambient temperatures or drying at elevated temperatures such as by heating. Typically, coating is suitably dried and/or cured after a time period of about 12 hours or more, in certain embodiments after a time period of 24 hours or more, in other embodiments after a time period of 48 hours or more, in still other embodiments after a time period of 72 hours or more.

After application and drying of the coating, e.g., top coat, a durable, print-receptive surface is formed. The resulting top coats can receive print, inks, or other similar compositions and promote bonding and/or adherence of the print, ink, or like composition to the underlying top coat.

G. Methods of Using Compositions

The top coat compositions are also well suited for receiving UV curable flexo inks or water based flexo inks as known in the art. In certain embodiments and/or applications, the top coats can be used in conjunction with all of these printing techniques and/or inks.

The top coat compositions described herein exhibit good resistance to scratches, nicking, and scuffing. The top coat compositions described herein also exhibit good resistance to solvents and environmental factors.

Narrow format UV ink jet presses typically have hundreds of print nozzles juxtaposed with each other. Often, some of the nozzles are blocked and therefore cannot apply ink to the substrate. If the substrate can facilitate ink "flow," ink from neighboring or adjacent nozzles can flow and merge to cover up the places where the ink from the blocked nozzles would have been applied.

Whether or not a coating can make ink flow sufficiently is determined by many factors, but generally correlates with the surface energy of the underlying substrate. A surface energy greater than 35 dyne is preferred, although a high surface energy, especially if it has high polar components, is not guaranteed to make the ink flow sufficiently. Situations have been observed that the surface can have highly polar components and hence greater surface energy, while still exhibiting relatively poor ink flow.

When high dot gain is desired, selecting polyurethane dispersions, acrylic dispersions or polyurethane/acrylic copolymers having relatively low surfactant content or that are surfactant-free may be desired. Specifically, a class of self-crosslinking low surfactant acrylics has been shown to be beneficial for obtaining high image quality. As a result, in some aspects, the formulations are self-crosslinking, without the need for a separate cross linker in the formulation itself.

The compositions described herein exhibit improved ink adhesion compared to current commercial formulations. In some embodiments, the compositions described herein exhibited an ink loss as measured by the tape test after crosshatch (ASTM D-3359) less than about 30%, 25%, 20%, 15%, 14%, 13%, 12%, 11%, 10%, 9%, 8%, 7%, 6%, 5%, 4%, 3%, 2%, or 1% when printed by UV flexo printing.

In some embodiments, the compositions described herein exhibited an ink loss as measured by the tape test after crosshatch (ASTM D-3359) less than about 30%, 25%, 20%, 15%, 14%, 13%, 12%, 11%, 10%, 9%, 8%, 7%, 6%, 5%, 4%, 3%, 2%, or 1% when printed by UV screen printing. In some embodiments, the compositions described herein exhibited an ink loss as measured by the tape test after crosshatch (ASTM D-3359) less than about 30%, 25%, 20%, 15%, 14%, 13%, 12%, 11%, 10%, 9%, 8%, 7%, 6%, 5%, 4%, 3%, 2%, or 1% when printed by Cold Foil printing. In some embodiments, the compositions described herein exhibited an ink loss as measured by the tape test after crosshatch (ASTM D-3359) less than about 30%, 25%, 20%, 15%, 14%, 13%, 12%, 11%, 10%, 9%, 8%, 7%, 6%, 5%, 4%, 3%, 2%, or 1% when printed by UV inkjet printing. In some embodiments, the compositions exhibited an ink loss as defined by one, two, three, four, or all five of the printing techniques described above.

In some embodiments, the surface energy of the topcoat is at least about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 dynes. In some embodiments, the compositions described herein have one more of the ink loss characteristics described above (e.g., one, two, three, four, or all 5 techniques) in combination with the surface energy described above.

In some embodiments, the composition described herein exhibit a UV ink jet drop spread of at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, or 110 microns. In some embodiments, the compositions described herein exhibit the drop spread described above, one or more of the ink loss characteristics described above, and the surface energy described above.

EXAMPLES i. Formulations

Eleven water-based coating formulations were prepared according to the formulations listed below in Table 1. The examples were organized in four experimental designs, indicated by the example numbers, with letters (A, B, C, etc.) designating examples within the same experimental design.

TABLE 1

Water-based coating formulations

| Ex. | UV Curable Component (Wt. %) | Non-UV Curable Acrylic Polymer (Wt. %) | Polyester Dispersion (Wt. %) | Non-UV Curable Polyurethane (Wt. %) | Additives (Wt. %) | Cross-linkers (Wt. %) | Water (Wt. %) |
|---|---|---|---|---|---|---|---|
| 1A | DSM R460 (9.62) | DSM A1127 (48.08) | — | — | Syloid S7000 (0.385) | — | Water (41.91) |
| 1B | DSM R460 (8.93) | DSM A1127 (44.64) | — | DSM R600 (4.46) | Syloid S7000 (0.36) | — | Water (41.61) |
| 2A | — | — | Eastek 1400 (39.13) | DSM R600 (9.39) DSM R9621 (7.83) | Syloid S7000 (0.31) | — | Water (43.34) |
| 2B | — | — | Eastek 1400 (39.13) | DSM R600 (9.39) DSM R9621 (7.83) | Syloid S7000 (0.31) | DSM CX100 (0.12) | Water (43.22) |
| 3A | DSM R460 (7.50) | — | Eastek 1400 (37.50) | DSM R600 (11.25) | Syloid S7000 (0.3) | — | Water (43.45) |
| 3B | LUX290 (10.87) | — | Eastek 1400 (27.16) | U4000 (5.43) | Sylobloc K200 (0.3) | — | Water (56.24) |
| 3C | DSM R460 (4.67) | DSM A1127 (16.36) | Eastek 1400 (16.36) | — | Sylobloc K200 (0.23) Tego Rad 2200N (0.7) | — | Water (61.68) |
| 4A | DSM R460 (4.67) | DSM A1127 (16.36) | Eastek 1400 (16.36) | DSM R600 (3.27) | Sylobloc K200 (0.23) | — | Water (59.11) |
| 4B | DSM R460 (15.15) | DSM A1127 (26.52) | Eastek 1400 (26.52) | — | Sylobloc K200 (0.30) | — | Water (31.51) |
| 4C | LUX 290 (8.52) | AC 3660 (11.93) | Eastek 1400 (11.93) | U4000 (8.52) | Sylobloc K200 (0.21) | — | Water (58.89) |
| 4D | DSM R460 (4.53) | DSM A1127 (15.86) | Eastek 1400 (15.86) | DSM R600 (5.44) | Sylobloc K200 (0.30) | — | Water (58.01) |
| 4E | LUX 290 (8.52) | AC 3660 (11.93) | Eastek 1400 (11.93) | U4000 (8.52) | Sylobloc K200 (0.21) | DSM CX-100 (0.04) | Water (58.85) | ii. Testing for UV Flexo and Water-Based Flexo Performance

Each of the formulations listed Table 1 as well as two commercially available coatings (Commercial Coating 1 and Commercial Coating 2) were coated using a pilot coater and tested on a full scale press. The ink anchorage results and image quality of the formulations in Table 1 were compared to each other and to the commercial coatings. The results are reported in Table 2.

For UV flexo printing, the coated rolls were printed with a Mark Andy PS press at 300 ft/min. Flint Flexocure Force Process Cyan (1200 lines per inch/1.3 billion cubic meters), Dense Black (400 lpi/4.15 bcm) and Opaque White (360 lpi/7.0 bcm) were printed. The ink anchorage was evaluated with 3M 810 tape. A tape test was carried out by directly positioning tape over the printed samples for 10 seconds with multiple rubs over the tape "Fail." An evaluation was considered to "Pass" if no ink failure was observed. A crosshatch test was carried out based on ASTM D-3359 (2009 Ed. 2). The percentage of ink lost was reported. Both the average of all the ink lost for the three colors and the worst ink lost were reported.

For water-based flexo printing, the coated rolls were printed with a Mark Andy PS press Flint Hydrofilm Ace (1200 lpi/2.59 bcm).

For UV screen printing, the coated was printed with a Mark Andy PS press at 150 ft/min. Flint Combiwide screen ink was used.

For Cold foil printing, the coated was printed with a Mark Andy PS press at 150 ft/min. Flint Flexo ThruCure Foil adhesive was used.

For UV inkjet printing, the coated rolls were printed on a Domino N610i press using UV 90 ink with Corona off and a fixed pinning level. Individual drop spread of Cyan, Magenta, Yellow and Black were measured and the average was reported, using a PIAS hand held high performance digital microscope (Quality Engineering Associates Inc, Billerica, Mass.).

TABLE 2

Formulation Testing

| Example | UV Flexo Crosshatch average | UV Screen Crosshatch | Cold Foil Crosshatch | UV IJ Crosshatch | UV IJ Drop Spread (μm) | Surface energy (Dyne) |
|---|---|---|---|---|---|---|
| Commercial coating 1 | 93% | 100% | 100% | 100% | 83 | — |
| Commercial coating 2 | 60% | 100% | 2% | 53% | 67 | — |
| 1A | 13% | 10% | 0% | 11% | 77 | 34.9 |
| 1B | 0% | 5% | 0% | — | — | 34.9 |
| 2A | 13% | 0% | 50% | 10% | 85 | 42.2 |
| 2B | 30% | 0% | 80% | — | — | 40.0 |
| 3A | 0% | 0% | 0% | 0% | 83 | 41.1 |
| 3B | 0% | 15% | 0% | — | — | 56.3 |
| 4A | 0% | 0% | 0% | 0% | 104 | 40.6 |
| 4B | 0% | 0% | 0% | 0% | 80 | 34.8 |
| 4C | 0% | 0% | 0% | 0% | 95 | 47.2 |
| 4D | 0% | 0% | 0% | — | — | 30.2 |
| 4E | 100% | 100% | — | — | — | — |

Formulation 3C was coated with a pilot coater and evaluated with a bench top Flexiproof 100 (RK Print Coat Instruments), with Zeller-Gmelin Low migration UV ink Y81 rather than a full scale press. The flexiproof was similar to a full scale press. By adding the additive Evonik TegoRad 2200 N, the percentage of ink lost decreased from 88% to 32%, when measured by tape test and crosshatch test.

The above results except Formulation 2B and 4E demonstrate that the formulations of the present disclosure exhibited surprisingly good ink adhesion and image quality on a variety of different substrates. Formulation 2B is formulation 1A with 0.12% cross-linker and Formulation 4E is Formulation 4C with 0.04% cross-linker, CX-100. After adding cross-linker in the formulation, the UV flexo ink anchorage became poor.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:

1. An aqueous coating formulation, comprising:
   water;
   a UV curable polymer comprising a UV curable polyurethane, a UV curable acrylic polymer, a UV curable polyurethane/acrylic copolymer, or combinations thereof;
   a non-UV curable acrylic polymer dispersion;
   a polyester dispersion;
   a non-UV curable polyurethane dispersion; and
   optionally one or more UV curable additives;
   wherein the formulation is free of cross-linker.

2. The formulation of claim 1, wherein the formulation is free of hard polyurethane.

3. The formulation of claim 1, wherein the formulation is free of photoinitiator.

4. The formulation of claim 1, wherein the formulation is free of hard polyurethane, crosslinker and photoinitiator.

5. The formulation of claim 1, wherein the formulation contains less than about 0.5 wt. % surfactant.

6. The formulation of claim 1, further comprising antiblocking agent.

7. The formulation of claim 6, wherein the antiblocking agent comprises silica or PMMA.

8. The formulation of claim 1, wherein the UV curable polymer comprises a UV curable polyurethane in an amount from about 1 wt. % to about 25 wt. %; the non-UV curable polyurethane dispersion is present in an amount from about 10 wt. % to about 40 wt. %; the polyester dispersion is present in an amount from about 10 wt. % to about 40 wt. %, and the non-UV curable acrylic polymer dispersion is present in an amount from about 10 wt. % to about 40 wt. %.

9. The formulation of claim 8, wherein the formulation is free of hard polyurethane.

10. The formulation of claim 8, wherein the formulation is free of photoinitiator.

11. The formulation of claim 8, wherein the formulation is free of hard polyurethane, crosslinker and photoinitiator.

12. The formulation of claim 8, wherein the formulation contains less than about 0.5 wt. % surfactant.

13. The formulation of claim 12, wherein the formulation contains less than about 0.3% surfactant.

14. The formulation of claim 13, wherein the formulation contains or less than about 0.1 wt. % surfactant.

15. A method for improving the ink adhesion and/or image quality for UV inkjet printing, the method comprising coating a substrate with the formulation of claim 1.

16. The method of claim 15, wherein the substrate is selected from cellulosic materials, polymeric films, or combinations thereof.

17. The formulation of claim 5, wherein the formulation contains less than about 0.3 wt. % surfactant.

18. The formulation of claim 17, wherein the formulation contains less than about 0.1 wt. % surfactant.

* * * * *